May 11, 1965    K. R. DI MENICHI ETAL    3,182,480
BAR TWISTER
Filed April 23, 1962    3 Sheets-Sheet 1

INVENTORS
KENNETH R. DIMENICHI
DANTE S. DIMENICHI
BY William W. Stokes
ATTORNEY

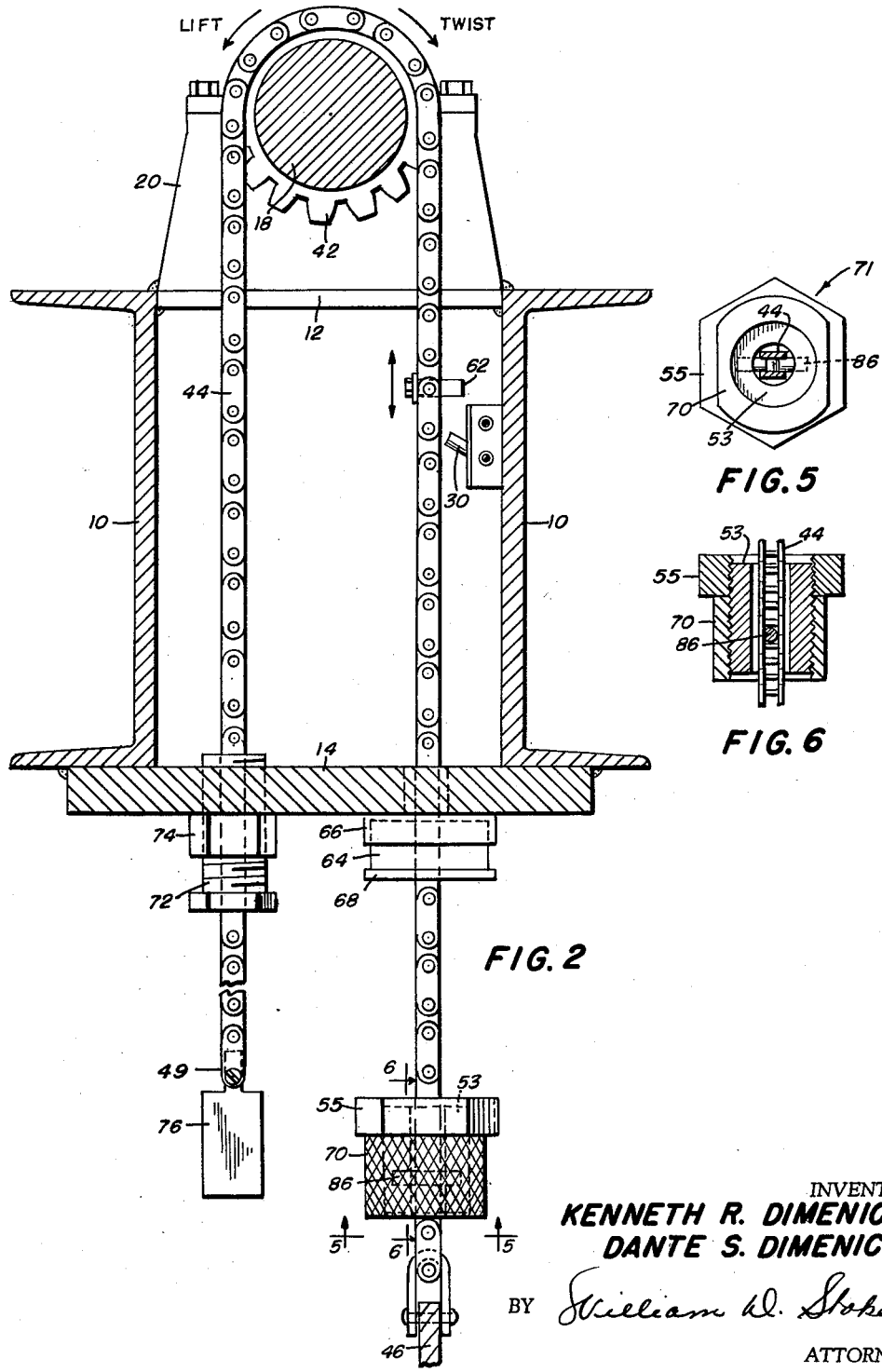

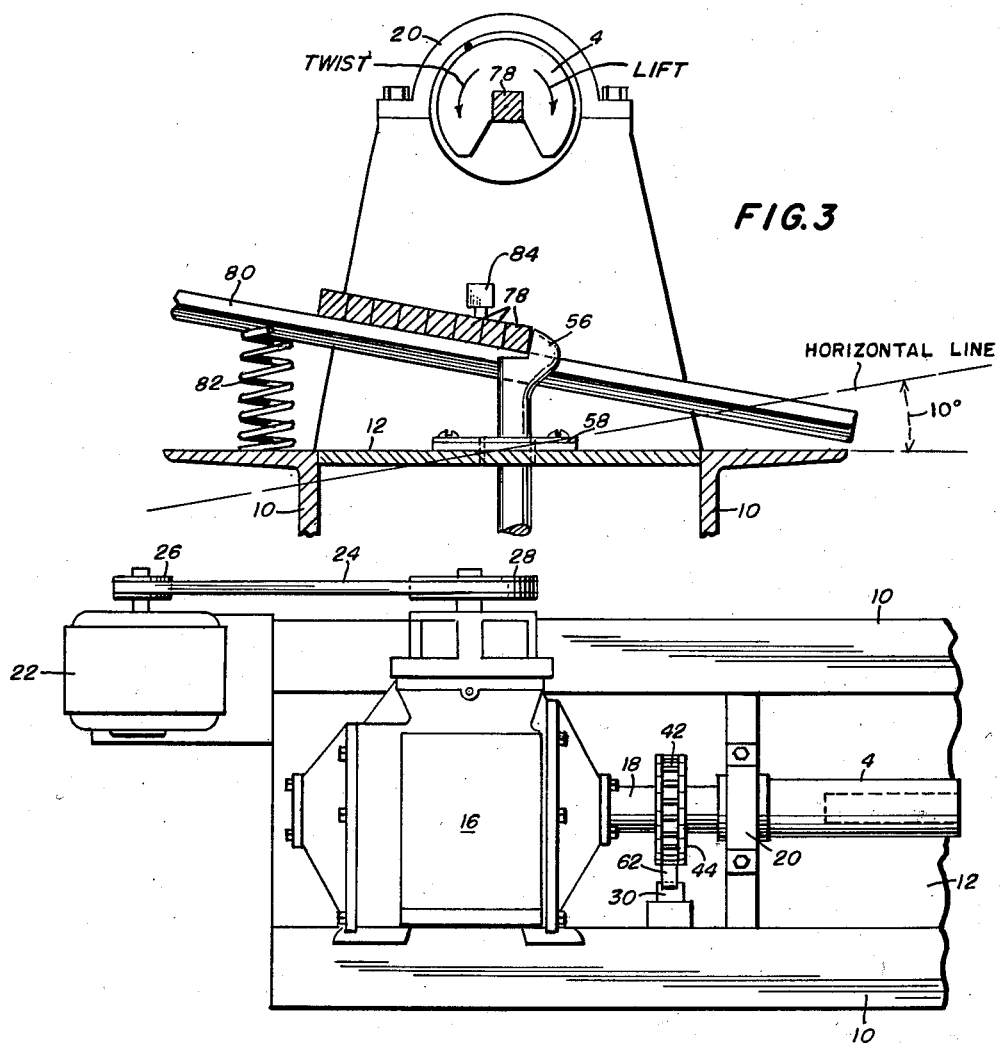

3,182,480
BAR TWISTER
Kenneth R. Di Menichi, 1735 Butztown Road, and Dante S. Di Menichi, 512 Elmhurst Ave., both of Bethlehem, Pa.
Filed Apr. 23, 1962, Ser. No. 189,514
12 Claims. (Cl. 72—299)

This invention relates to a machine for twisting metallic bars or rods and, more particularly, relates to a machine for automatically and uniformly twisting bar stock, imparting thereto twists of any desired number of complete rotations and, in particular, this invention is concerned with a novel apparatus which automatically feeds, twists, and discharges feedstock.

The use of metal twisted in an ornamental fashion is becoming increasingly popular in building construction. Such metal bars are used in construction of bannisters, supports for overhanging roofs, fences, and the like, offering many advantages over prior known and used building materials. Heretofore, where a plurality of uniformly twisted metallic bars were required, for example, in the construction of an ornamental bannister, such were relatively expensive or difficult, if not impossible, to obtain. In the known methods of twisting bars, the twist imparted to the bars is often not uniform, hence, the ends do not align with each other, requiring a great deal of manual skill and subsequent work to make the bars suitable for the purposes intended. In addition, in known machines, the feedstock as a rule has to be hand fed singly to the machine and manually removed subsequent to twisting. Furthermore, in the known automatic methods, the feedstock has to be partially untwisted for removal from the twisting device.

Broadly, the invention includes a reversibly rotatable chuck means and a stationary chuck for receiving and holding the feedstock to be twisted. Reversible driving means are operatively connected with the rotatable chuck. Chain lifting means are operatively engaged with the rotatable chuck driving means, one end of said chain means being connected with feedstock lifting means which means lift the stock into the chucks for twisting, the other end of the chain lifting means being connected with means for controlling the number of twists imparted to the rod. Means are provided on the chain lifting means to cause reversal of the chuck driving means and, in turn, reversing the direction of rotation of the rotatable chuck, discharging the twisted stock after the desired twist has been imparted thereto and receipt into the chucks of another piece of feedstock for twisting. Feeding and guide means are provided for delivering one piece of feedstock at a time into the lifting means.

It will be readily observed that this invention provides an automatic stock twisting machine of a unitary construction including automatic lifting and feeding means, driving means, twisting and discharge means, producing a uniform product heretofore unachievable in the automatic bar twisters known in the art.

It is therefore an object of this invention to provide a bar twisting machine which provides automatic feeding, lifting, and discharge means for the bars.

Another object of this invention is to provide an automatic bar twisting machine which may be continuously operated with little or no maintenance or supervision.

Still another object of this invention is an automatic bar twister which produces twisted metallic rods or bars of a controlled uniformity.

A further object of this invention is the provision of an automatic bar twister having adjustable means for achieving any desired number of full twists in the bar or rod to be twisted.

Another object of the invention is to provide a novel bar lifting mechanism which is simple and practical in construction and efficient in operation.

Still another object is to provide an automatic bar twisting machine which is economical to manufacture and requires little or no maintenance and supervision in operation.

Other objects and advantages of this invention will become apparent from the following description taken in connection with the accompanying drawings.

Referring now to the drawings wherein like parts have been designated by the same numerals:

FIGURE 2 is a sectional view taken along the line of 2—2 of FIGURE 1;

FIGURE 3 is a sectional view taken on line 3—3 of FIGURE 1 showing the bar feeding means, the lifter rod, rotatable chuck, and discharge rack;

FIGURE 4 is a top view partly in section showing the arrangement of the motor driving means, gear reducer, reversible chuck driving means and reversing switch means.

FIGURE 5 is a bottom plan view partly in section of the adjustable turn limit stop assembly taken on line 5—5 of FIGURE 2.

FIGURE 6 is a sectional view taken on line 6—6 of FIGURE 2.

Figure 1:
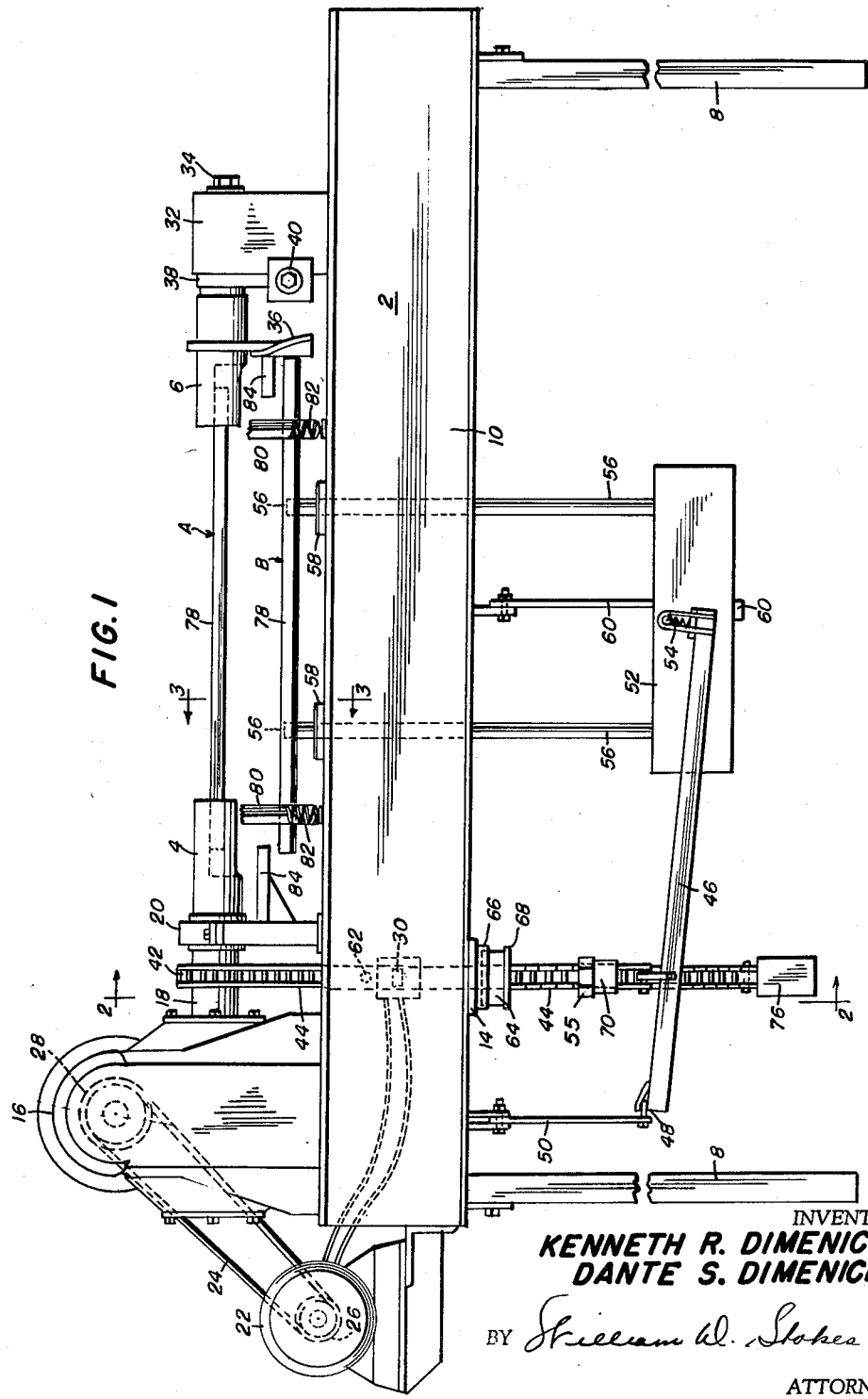
FIGURE 1 is a side elevation of the automatic bar twisting machine of this invention showing the rotatable chuck, reducing gear housing, motor, lifting mechanism, and stationary chuck with guide.

Referring now to the drawings in detail wherein like parts have the same number, the rod or bar twisting machine of this invention comprises a main frame 2, a rotatable chuck 4 and a stationary chuck 6. Frame 2 consists of adjustable legs 8 and parallel ways 10, ways 10 being rigidly connected by a plurality of upper and lower cross-pieces 12 and 14. Rotatable chuck 4 is operatively connected to a gear reducer 16 by drive shaft 18 journaled through bearing cap 20. Rotatable chuck driving means comprises drive shaft 18, gear reducer 16, reversible motor 22, drive belt 24, and pulleys 26 and 28. Motor 22 is controlled by motor reversing switch 30 mounted on the inner side of ways 10 of frame 2.

Stationary chuck 6 is mounted on chuck support 32 and held in place by chuck retaining bolt 34, said chuck support 32 being adjustable along parallel ways 10 to accommodate for the different lengths of bars to be twisted. Guide 36, mounted on stationary chuck 6, guides the end of the bar to be twisted into the stationary chuck. Chuck 6 is angularly adjustable for stationary positioning by adjustment arm 38 mounted on chuck 6. Chuck adjustment arm screw 40 is provided to preset and lock stationary chuck 6 at the correct angle for receiving the bar to be twisted.

Sprocket means 42 is mounted on drive shaft 18. Chain means 44, driven by sprocket 42, is connected on one end to lift lever 46 and on the other end to a variable turn assembly and limit stop assembly to be discussed hereinafter. Lift lever 46 is connected on one end to frame 2 through pivot 48 mounted on stop foot 50, the other end of lift lever 46 being connected with rod lifter plate 52 by means of a lift delay spring assembly 54. Vertically and upwardly movable lifter rods 56 are connected at their lower end to rod lifter plate 52 and journaled through lifter rod seals 58 in the aforementioned cross-pieces mounted between parallel ways 10 of frame 2. Fixed lifter plate stop 60 mounted on frame 2 is provided to limit the downward movement of lifter plate 52.

Adjustably mounted on chain 44 is a reversing switch trip 62 which, as chain 44 is raised or lowered, trips switch 30 causing said switch to reverse which causes motor 22 to reverse. The end of chain 44 holding lift lever 46 is journaled through cross-piece 14 of frame 2, passing through rubber block 64 which is affixed to the underside of said frame by rubber block retainer 66 and block plate 68. Rubber block 64, in addition to purposes hereinafter discussed, holds chain 44 in rigid alignment with respect to motor reversing switch 30. An adjustable turn limit stop assembly 71, mounted beneath block plate 68 on chain 44 is adjustable along said chain to limit the upward or feeding movement of chain 44.

The other end of chain 44 is journaled through adjustable limit stop bolt 72, said limit stop bolt being threadedly mounted in bottom cross-piece 14 by limit lock nut 74. On this end of chain 44 there is attached a limit stop 76 which, when the chain rises, engages with adjustable limit stop bolt 72. It is readily seen that the length of chain between limit stop 76 and adjustable limit stop bolt 72 determines the number of counterclockwise revolutions of drive shaft 18. When referring to direction of rotation herein, reference is made to the directional arrows shown in FIGURE 3.

The reversing mechanism, consisting of limit stop 76 and adjustable limit stop bolt 72 on one end of chain 44, and rubber block plate 68, rubber block 64, motor reversing switch 30, reverse switch trip 62, and turn limit stop assembly 71 on the other end of chain 44, is so arranged that in the limit of the cycle, there is no sudden impact stop. This arrangement of the elements of the reversing mechanism functions as a torque eliminator, that is, in operation the elements of the reversing mechanism cooperate to slow down gear reducer 16 from full speed to zero in a fraction of a second without a sudden impact stop.

The bars to be twisted, shown as numeral 78, are placed on bar rack 80, said rack being slightly tilted toward lifter rods 56, allowing the bars to slide forward and downwardly feeding onto the upper ends of said lifter rods. The upper ends of said lifter rods are designed in such a manner as to catch and prevent the further downward movement of the bars to be twisted on rack 80. Feeder rack 80 is supported on frame 2 by rack support springs 82. Bar stop means 84 are mounted on stock guide 36 and the base mount of bearing cap 20 is provided to prevent the feeding of more than one bar at a time to lifter rods 56. The entire apparatus being mounted on adjustable legs 8 may be slanted at an angle in two directions, i.e., away from the loading side and to the right, for example, as shown by the horizontal line in FIG. X3 which slant, coupled with the inherent vibrations of the machine through rack support springs 82 maintains a constant feeding of the bars to be twisted onto the lifter rods 56 and against the stock guide 36.

Referring to FIGURES 2, 5 and 6 in detail, it is seen that the turn limit stop assembly 71 comprises an inner sleve 53 adjustably mounted on chain 44 and fixed into the desired position on the chain by a spring pin 86 inserted through a link of chain 44 and engageable at its outer ends with lock slot (not shown) in the inner surface of inner sleeve 53. Outer sleeve 70 is threadedly engaged with the outer surface of sleeve 53. Lock nut 55 also threadedly engaged with inner sleeve 53, is provided to lock outer sleeve 70 in the desired position relative to the inner sleeve. The turn stop assembly is provided to make the fine adjustments in the angle of the jaws of movable chuck 4 with respect to the angle of the jaws of stationary chuck 6, i.e., limiting the angular movement of the movable chuck to release the twisted bar stock and receive a bar to be twisted.

Adjustable limit stop bolt 72 is threadedly engaged through lower cross-piece 14. Locknut 74 is provided to lock adjustable limit stop bolt 72 in the desired position. Chain 44 is journaled through adjustable limit stop bolt 72 and attached by suitable means (not numbered) at its lower end to limit stop 76. The variable turn twist assembly comprises a removable length of chain inserted in chain 44 by means of and delineated by removable links 49 (upper removable link not shown) between limit stop 76 and the lower end of chain 44. It is readily seen that the length of the removable chain determines the number of full twists imparted to the bar stock during the twisting cycle while adjustable limit stop bolt 72 provides a means of finely adjusting the feed-stock to insure that both ends of the twisted bar are squarely aligned.

In operation, the feedstock 78 to be twisted, is loaded onto rack 80. Letter A in FIGURE 1 indicates a piece of feedstock in position to be twisted and letter B shows a piece of feedstock in position to be lifted to the twisting operation. The length of the feedstock may vary from operation to operation. The maximum length is controlled only by the length of ways 10. Stationary chuck support 32 is adjusted along ways 10 to the proper distance required to accommodate the length of the bars to be twisted.

The slant of rack 80 causes one bar at a time to slide onto the heads of lifter rods 56. When motor 22 is switched on to begin the initial cycle, gear reducer 16 will cause shaft 18, sprocket 42 and chuck 4 to rotate in a clockwise manner. The clockwise rotation of sprocket 42 moves chain 44 in a clockwise manner, raising lifter lever 46 and lifter plate 52. The heads of lifter rod 56 containing the stock to be twisted, are also caused to rise by the raising of lifter plate 52, placing the stock in the jaws of the chucks preparator to the twisting operation. The lifting movement of chain 44 and in turn the clockwise rotation of sprocket means 42 is arrested by turn limit stop assembly which brakes the upward movement of chain 44 as the assembly makes contact with rubber block plate 68. As chain 44 rises in the lifting cycle, switch trip 62 trips switch 30 causing motor 22 and, in turn, gear reducer 16 to reverse the direction of rotation of shaft 18 and chuck 4 to a counter-clockwise or twisting rotation. The tripping of switch 30 occurs and is arranged to happen before the placing of the bar to be twisted into the chucks by lifter rod 56.

Motor driving means 22 may be any conventional motor, for example, a 110 volt capacitor type, equipped with starting winding, running winding and a centrifugal switch. The two windings in the motor driving means enable the drive to be reversed, i.e., it is reversed on the starting winding while twisting is done on the running winding. The centrifugal switch changes the direction of the motor by switching from one winding to another which is dependent upon the revolution per minute. When the switch is thrown to the reverse or starting winding while twisting of the bar stock is being carried out at the higher r.p.m., the actual reversal does not occur until limit stop 76 brakes the motor down to the starting winding r.p.m. Gear reducer 16 driven by motor driving means 22 may be any commercially available stock worm gear drive unit.

The compression of lift delay spring 54 by lifter lever 46 provides the necessary tension to hold lifter lever 46 in the up position momentarily while the direction of rotation of chuck 4 is reversed for the twisting operation. The delay enables lifter rods 56 to hold the stock to be twisted in the chucks while the direction of rotation of chuck 4 is reversed, thus gripping the bar for twisting. When the twisting cycle begins, the compression of spring 54 is relieved by the slacking of chain 44. The counter clockwise movement of sprocket 42 causes chain 44 and in turn lifter lever 46, lifter plate 52 and lifter rods 56 to return to the initial position for the receipt of another bar to be twisted.

The slant of rack 80 and the inherent vibration of the machine transmitted to the rack through support springs 82 causes another piece of stock to slide onto the respective heads of lifter rods 56.

It is seen that the number of twists imparted to the rod is determined by the number of degrees of counterclockwise rotations of chuck 4. The degree of counterclockwise rotation of chuck 4 is determined by the length of the variable turn assembly chain segment delineated by removable links 49.

Variable turn assembly chain segments are provided in predetermined lengths to produce bars twisted from a minimum of one full 360° twist to any desired full number of 360° twists; limit stop 76 braking the upward counterclockwise movement of the chain against adjustable limit stop bolt 72.

During the counterclockwise twisting operation, motor switch 30 has been thrown to opposite position by reversing switch trip 62 on chain 44, thus, motor 22 wiring has been reversed.

As set out hereinabove, the variable turn assembly is arranged in a manner as to produce as many full 360° twists to the stock as desired. Thus, it is seen that, when limit stop 76 brakes against adjustable limit stop bolt 72, the rotatable chuck comes to a momentary stop at which moment the rotatable chuck is substantially perfectly aligned with the stationary chuck and the twisted bar is caused to drop onto the opposite side of the apparatus from the feeding side and onto a skid (not numbered). The clockwise rotation of the chuck then begins returning chuck 4 to the initial position for receipt of another bar to be twisted during the next cycle, which lifting and twisting cycles are continuously and automatically carried on.

It is obvious that these and other modifications can be resorted to without departing from the spirit and scope of this invention. Accordingly, only such limitations should be imposed as are specifically set forth in the appended claims.

We claim:

1. An apparatus for automatically twisting stock in a successive series of operations comprising, rotatable chuck means for receiving one end of the stock, stationary chuck means adapted to receive the respective opposite end of said stock, reversible driving means connected with said rotatable chuck means, means operatively connected with said rotatable chuck driving means for lifting stock to be twisted into said chucks for twisting when said rotatable driving means is rotating in one direction, means for reversing the direction of rotation of said rotatable chuck means to twist said stock, and means for braking and reversing said twisting rotation of said rotatable chuck at the end of a predetermined number of rotations, said braking causing the twisted stock to be freed from said chuck means and said cycle beginning again.

2. An apparatus for automatically twisting stock in a successive series of operations comprising, rotatable chuck means for receiving one end of the stock, stationary chuck means adapted to receive the respective opposite end of said stock, reversible driving means connected with said rotatable chuck means, means operatively connected with said rotatable chuck driving means for lifting said stock into said chuck means when said rotatable driving means is rotating in one direction, means for reversing said driving means and said rotatable chuck for twisting during the lifting operation and means operatively connected with said lifting means for arresting said rotatable chuck and causing reversal of the direction of rotation of said rotatable chuck means, twist control means for causing twisting rotation of said rotatable chuck for a predetermined number of rotations, and braking means connected with said twist control means to the end that the twisted stock is freed from said chuck means at the moment of braking said rotatable chuck means and said cycle beginning again.

3. An apparatus for automatically twisting stock in a successive series of operations comprising, rotatable chuck means for receiving one end of the stock, stationary chuck means adapted to receive the respective opposite end of said stock, reversible driving means connected with said rotatable chuck means, means drivingly connected with said rotatable chuck driving means for lifting stock and placing in said chuck means to be twisted when said rotatable driving means is rotating in one direction, means for reversing said driving means during the lifting operation, means connected with said lifting means for braking said lifting operation to cause reversal of the direction of rotation of said rotatable chuck means, twist control means operatively connected with said rotatable chuck driving means for determining the number of twists imparted to said stock when said rotatable driving means is rotating in a direction opposite to that of the lifting operating, braking means connected with said twist control means to brake said twisting operation, said stock being freed from said chuck means substantially simultaneously with the braking of said twisting operation and beginning a new cycle.

4. A machine for automatically twisting stock in a successive series of operations comprising, means for receiving and delivering the stock to be twisted to a lifting position, reversible driving means, reversibly rotatable chuck means for receiving one end of the stock, other stationary chuck means adapted to receive the respective opposite end of said stock, said rotatable chuck means drivingly engaged with said reversible driving means, chain means connected with said driving means and adapted to be driven in the direction corresponding to the direction of rotation of said rotatable chuck means, lifting means attached to one end of said chain means for raising and delivering the stock to be twisted into said chuck means, means for reversing said driving means to begin the twisting cycle, means connected with the other end of said chain means for limiting the twisting rotation of said rotatable chuck driving means, said stock being freed from said chuck means substantially simultaneously with the limiting of said twisting rotation of said rotatable chuck means and begining a new cycle.

5. A machine for automatically twisting stock in a successive series of operations comprising, means for receiving and delivering the stock to be twisted to a lifting position, reversible driving means, reversibly rotatable chuck means for receiving one end of the stock and drivingly engaged with said driving means, other stationary chuck means adapted to receive the respective opposite end of said stock, chain means operatively connected with said driving means and adapted to be driven in the direction corresponding to the direction of rotation of said rotatable chuck means, stock lifting and receiving means attached to one end of said chain means for lifting the stock into said chuck means, means operatively engageable with said chain means for causing reversal of said driving means and in turn the direction of rotation of said rotatable chuck means, means connected with the other end of said chain means for limiting the twisting rotation of said rotatable chuck driving means to a predetermined number of 360° rotations, said stock being freed from said chuck means substantially simultaneously with the limiting of said twisting rotation of said rotatable chuck and the reversal of the direction of rotation of said rotatable chuck means to begin a new cycle.

6. An apparatus for automatically feeding and twisting stock in a successive series of operations comprising, slide means for receiving and delivering the stock to be twisted to a lifting position, reversible motor driving means, reversibly rotatable chuck means for receiving one end of the stock and drivingly engaged with said motor driving means, stationary chuck means adapted to receive the respective opposite end of said stock, chain means operatively connected with said reversibly rotatable chuck means and adapted to be driven in a direction corresponding to the direction of rotation of said rotatable chuck means, stock lifting means attached to one end of said chain means for lifting the stock into said chuck means, means on said chain means for causing reversal of said motor driving means as said chain means is raised and lowered, adjustable braking means interposed on said chain between said stock lifting means and said rotatable chuck driving means for braking the upwardly lifting movement of the one end of said chain upon reversal of said motor driving means and receipt of the stock into the chuck means for twisting, twist limting and braking means on the other end of said chain means to limit the twisting rotation of said rotatable chuck to a predetermined number of rotations, said twisted stock being freed when said chuck is braked and said motor driving means having been reversed beginning a new cycle.

7. In a machine for automatically twisting bars in a successive series of operations, a main frame, slide means connected with said main frame for receiving and delivering the bars to be twisted to a predetermined position to be lifted to a position for twisting, chuck means for receiving each end of the bar in the position for twisting, said chuck means being in longitudinal alignment for receipt of said bars, one of said chuck means being reversibly rotatable, reversible driving means for said reversibly rotatable chuck means, the other chuck means being stationary to receive the respective opposite end of said bar, lifter rod means for lifting the bars to be twisted from said slide means into said chuck means and holding said bar momentarily in said chuck means until said rotatable chuck means commences rotation relative to said stationary chuck means, helically twisting said bar, means connected with said reversible driving means for raising and lowering said lifter rod means, means for arresting the twisting rotation of said rotatable chuck means when the bar has been subjected to a predetermined number of twists, said rotatable chuck means releasing said twisted bar upon becoming longitudinally aligned in the arrested position, said rotatable chuck means being reversed for the beginning of a new cycle.

8. In a machine for automatically feeding, twisting and discharging bars in a successive series of operations, a main frame, inclined slide means connected with said main frame for receiving and delivering the bars to be twisted to a predetermined position for lifting to the position for twisting, chuck means for receiving each end of the bar in the position for twisting, said chuck means being in longitudinal alignment for receipt of said bars, one of said chuck means being reversibly rotatable, the other chuck means being stationary with respect to said longitudinal alignment of the bar receiving portion and longitudinally adjustable along said main frame to accommodate for different lengths of bars to be twisted, reversible driving means for said reversibly rotatable chuck means, lifter rod and holding means for lifting the bars to be twisted from said slide means into said chuck means and holding said bar momentarily in said chuck means until said rotatable chuck means commences twisting rotation relative to said stationary chuck means, means connected with said reversible driving means for raising and lowering said lifter rod means, means connected with said reversible driving means for arresting the twisting rotation of said rotatable chuck means when the bar has been subjected to a predetermined number of twists, said rotatable chuck means releasing said twisted bar upon becoming longitudinally aligned in the arrested position, said rotatable chuck means being reversed for the beginning of a new cycle.

9. In a machine for automatically feeding, twisting and discharging bars in a successive series of operations, a main frame, inclined slide means connected with said main frame for receiving and delivering the bars to be twisted to a predetermined position for lifting to the position for twisting, chuck means for receiving each end of the bar in position for twisting, said chuck means being in longitudinal alignment for receipt of said bars, one of said chuck means being reversibly rotatable, the other chuck means being stationary, said stationary chuck means also being longitudinally adjustable along said main frame to accommodate for different lengths of bars to be twisted, reversible driving means for said reversibly rotatable chuck means, chain means operatively connected with said reversible driving means, said chain means moving in a direction corresponding to the direction of rotation of said rotatable chuck means, lifter rod and holding means operatively connected with one end of said chain means for lifting the bars to be twisted from said slide means into said chuck means and holding said bar momentarily in said chuck means until said rotatable chuck means commences twisting rotation relative to said stationary chuck means, means connected with the chain means for arresting the lifting rotation of said rotatable chuck means, means connected with the other end of said chain means for arresting the twisting rotation of said rotatable chuck means when the bar has been subjected to a predetermined number of twists, said chuck means releasing said twisted bar upon becoming longitudinally aligned in the arrested position, said rotatable chuck means being reversed for the beginning of a new cycle.

10. In a machine for automatically twisting bars in a successive series of operations, a main frame, inclined slide means connected with said main frame for receiving and delivering the bars to be twisted to a predetermined position for lifting to the position for twisting, chuck means for receiving each end of the bar for twisting, said chuck means being in longitudinal alignment for receipt of said bars, one of said chuck means being reversibly rotatable, the other chuck means being stationary, said stationary chuck means being longitudinally adjustable along said main frame to accommodate for different lengths of bars to be twisted, reversible driving means for said rotatable chuck means, chain means operatively connected with said reversible driving means, said chain means moving in a direction corresponding to the direction of rotation of said rotatable chuck means, lifter means operatively connected with one end of said chain means for lifting the bars to be twisted from said slide means into said chuck means, lift delay means operatively connected with said lifting means and said chain means for holding said bar momentarily in said chuck means until the direction of rotation of said rotatable chuck means is reversed for the twisting operation, means connected with said chain means for arresting the rotation of said rotatable chuck means when said bar has been placed into said chuck means, means connected with the other end of said chain means for arresting the twisting rotation of said rotatable chuck means when the bar has been subjected to a predetermined number of twists, said chuck means releasing said twisted bar upon becoming longitudinally aligned in the arrested position, said rotatable chuck means being reversed for the beginning of a new cycle.

11. The machine of claim 9 wherein the means for arresting the lifting rotation of said rotatable chuck means comprises resilient block means mounted on said main frame through which said chain passes and an adjustable stop means movably mounted along said chain means said adjustable stop making contact with said block means and arresting the upwardly lifting movement of said chain means.

12. The apparatus of claim 9 wherein the main frame is angularly tilted, said bars to be twisted being received on one side of said main frame and released after twisting a predetermined number of twists to the other side of said main frame.

References Cited by the Examiner
UNITED STATES PATENTS

| 63,570 | 4/67 | Smith | 153—78 |
| 1,379,071 | 7/19 | Wineman | 153—78 |
| 2,468,717 | 4/49 | Wennberg | 153—78 |
| 3,067,800 | 12/62 | Gogan | 153—78 |

FOREIGN PATENTS 273,769   1929   Great Britain.

CHARLES W. LANHAM, *Primary Examiner.*